United States Patent [19]

Chang et al.

[11] Patent Number: 4,605,637

[45] Date of Patent: * Aug. 12, 1986

[54] HYDROTHERMAL ACTIVATION OF ACID ZEOLITES WITH ALUMINUM PHOSPHATES

[75] Inventors: Clarence D. Chang, Princeton; Michael E. Landis, Woodbury; Joseph N. Miale, Lawrenceville, both of N.J.

[73] Assignee: Mobil Oil Corporation, New York, N.Y.

[ * ] Notice: The portion of the term of this patent subsequent to Aug. 28, 2001 has been disclaimed.

[21] Appl. No.: 693,444

[22] Filed: Jan. 22, 1985

Related U.S. Application Data

[63] Continuation-in-part of Ser. No. 465,987, Feb. 14, 1983, Pat. No. 4,513,091.

[51] Int. Cl.[4] .......................... B01J 29/06; B01J 27/14
[52] U.S. Cl. ........................................ 502/64; 502/71; 502/77; 502/214

[58] Field of Search .................... 502/71, 77, 214, 64, 502/85

[56] References Cited

U.S. PATENT DOCUMENTS

| | | | |
|---|---|---|---|
| 4,420,418 | 12/1983 | Chu | 502/85 X |
| 4,468,475 | 8/1984 | Kuehl | 502/85 X |

*Primary Examiner*—Carl F. Dees
*Attorney, Agent, or Firm*—Alexander J. McKillop; Michael G. Gilman; Edward F. Kenehan, Jr.

[57] ABSTRACT

There is provided a process for activating a zeolite with an aluminum phosphate material. The process comprises hydrothermally treating an intimate mixture of the zeolite and an effective amount of aluminum phosphate activating agent in contact with an aqueous liquid phase under reaction conditions to increase the cracking activity of the mixture. Examples of zeolites which may be activated include low acidity zeolites such as boron-containing ZSM-5, boron-containing zeolite Beta and high silica ZSM-5. The aluminum phosphate may be in the form of a microporous, crystalline framework material such as AlPO$_4$-5.

1 Claim, No Drawings

HYDROTHERMAL ACTIVATION OF ACID ZEOLITES WITH ALUMINUM PHOSPHATES

CROSS-REFERENCE TO RELATED APPLICATIONS

This application is a continuation-in-part of U.S. application Ser. No. 465,987, filed Feb. 14, 1983, now U.S. Pat. No. 4,513,091 in the name of Clarence D. Chang and Joseph N. Miale.

This Chang et al application, the entire description of which is incorporated herein by reference, describes the hydrothermal activation of zeolites with various aluminum compounds including aluminum phosphate. Note page 10, lines 1-7 of this Chang et al application.

This application is related to U.S. application Ser. No. 512,511, filed July 11, 1983 in the name of Guenter H. Kuehl and Edward J. Rosinski, which application issued as U.S. Pat. No. 4,468,475 on Aug. 28, 1984. This Kuehl et al patent, the entire disclosure of which is expressly incorporated herein by reference, describes the hydrothermal activation of high-silica zeolites with various aluminum compounds including aluminum phosphate. Note column 6, lines 38-41 of this Kuehl et al patent.

This application is also related to U.S. application Ser. No. 693,445 filed Jan. 22, 1985, in the name of Garry W. Kirker, Michael E. Landis and Jeffrey H. Yen. This Kirker et al application, the entire disclosure of which is incorporated herein by reference, describes the catalysts comprising microporous, microcrystalline aluminum phosphates and zeolites.

BACKGROUND

This invention relates to a technique for increasing the catalytic activity of crystalline zeolites. In particular, a novel activation process is provided to enhance the alpha value of high-silica zeolites by hydrothermal treatment in contact with an aluminum phosphate activating agent.

Zeolite catalysts have become widely used in the processing of petroleum and in the production of various petrochemicals. Reactions such as cracking, hydrocracking, alkylation, dealkylation, transalkylation, isomerization, polymerization, addition, disproportionation and other acid catalyzed reactions may be performed with the aid of these catalysts. Both natural and synthetic zeolites are known to be active for reactions of these kinds.

Recently, synthetic zeolites containing high proportions of silica relative to alumina have been developed and zeolites of this kind have shown themselves to be useful. U.S. Pat. No. 3,702,886 to Argauer et al discloses a class of crystalline aluminosilicates designated ZSM-5 which have highly advantageous properties. U.S. Pat. No. 3,941,871 and its U.S. Pat. No. Re. 29,948 to Dwyer et al disclose crystalline organosilicates which exhibit a structure, as evidenced by X-ray diffraction pattern, similar to that of ZSM-5, but with high ratios of silica relative to alumina. Materials of this kind are stated to exhibit low aging rates and to have low coke making properties when used in hydrocarbon processing.

Various treatments have been proposed in the past for modifying the activity of the zeolites, either by reducing it when too active or by increasing it when insufficient. One such treatment has been steaming and in the past it has generally been used to decrease the activity of the zeolite, as reported in "Fluid Catalytic Cracking with Zeolite Catalysts", Venuto and Habib, Marcel Dekker Inc., N.Y., N.Y. 1979.

The reduction of activity is not, however, necessarily undesirable because it may in certain circumstances be accompanied by an improvement in other characteristics of the zeolite, for example, resistance to aging. This fact has been exploited in certain processes, for example, in the alkylation process described in U.S. Pat. No. 4,016,218, which employs a zeolite catalyst which has been subjected to a prior thermal treatment either in an inert atmosphere or by steaming, to reduce its activity. The deactivation caused by the steam becomes more pronounced at higher temperatures and with longer reaction times.

It has also been found that steaming may in certain instances have beneficial effects upon the catalyst. U.S. Pat. No. 3,257,310, for example, describes a method for preparing a cracking catalyst of high activity and selectivity by steaming a zeolite for at least two hours at a specified temperature. The zeolites described in this patent include natural zeolites such as mordenite and faujasite and synthetic zeolites such as zeolites X, Y and L.

U.S. Pat. Nos. 4,149,960 and 4,150,062 describe the use of water in the feedstock during operation to reduce coking and aging rates. U.S. Pat. No. 3,546,100 describes a method for maintaining the selectivity of a hydrocracking catalyst by restricting the partial pressure of water during the hydrocracking operation.

U.S. Pat. No. 3,493,519 describes a method of producing hydrothermally stable cracking catalysts by calcining zeolite-Y in the presence of steam, a process which was theorized to cause lattice aluminum defects which, after subsequent treatment by base exchange with ammonium salts, chelation and calcination in air produced the desired highly active product.

U.S. Pat. No. 3,493,490 describes a method for restoring the activity to used catalyst by controlled treatment with anionic reagents including water at high temperatures, even with catalysts which had initially been steamed to reduce their level of cracking activity, such as zeolites X and Y.

U.S. Pat. No. 3,758,403 describes a method for cracking hydrocarbon feedstocks using a mixture of zeolites including a ZSM-5 type zeolite and a large pore zeolite such as zeolites X, Y or L or faujasite. The selectivity of the catalyst is said to be improved by treatment with steam which if desired, may be carried out in the cracking unit itself.

Previous work in activation has shown substantial increases in activity for ZSM-5 type zeolites treated with aluminum halides or organo-aluminum complexes at elevated temperatures. Fluoride treatment at various pH levels has also been studied. Another zeolite activation technique employed steaming a high silica (1600:1 $SiO_2:Al_2O_3$) crystalline alumino-silicate acid ZSM-5 in intimate mixture with an activating metal oxide, such as alpha alumina, at high temperature to achieve increased cracking activity.

Although certain zeolites may be described as materials containing silica and alumina, it is recognized that the silica and alumina portions may be replaced in whole or in part with other oxides. More particularly, $GeO_2$ is an art recognized substitute for $SiO_2$ and $B_2O_3$, $Cr_2O_3$, $Fe_2O_3$, and $Ga_2O_3$ are art recognized replacements for $Al_2O_3$. Accordingly, the term zeolite as used herein shall connote not only materials containing silicon and, optionally, aluminum atoms in the crystalline lattice structure thereof, but also materials which contain suitable replacement atoms for such silicon and/or aluminum. On the other hand, the term aluminosilicate zeolite as used herein shall define zeolite materials consisting essentially of silicon and, optionally, aluminum atoms in the crystalline lattice structure thereof, as opposed to materials which contain substantial amounts of suitable replacement atoms for such silicon and/or aluminum. Furthermore, descriptions herein referring to zeolites as being boron-containing shall connote that the zeolite contains boron in the framework structure thereof, e.g., in place of at least a portion of the framework aluminum in an aluminosilicate zeolite.

SUMMARY

A novel hydrothermal technique has been discovered for treating high-silica ZSM-5 zeolite catalysts to obtain enhanced catalytic activity. During treatment the zeolite is contacted with an activating amount of aluminum phosphate in the presence of liquid water or other aqueous media at elevated temperature. The activated catalyst composition may comprise an intimate mixture of zeolite and activating aluminum phosphate binder material or the hydrothermally activated zeolite may be recovered separately.

A zeolite having a silica:alumina ratio of at least 70 and a constraint index from 1 to 12 and may be treated with an activating agent at an elevated temperature in the presence of liquid water to substantially increase cracking activity of the catalyst. This catalyst composition may be made in composite form from high-silica ZSM-5 type crystalline zeolites by a method which comprises mixing the zeolite with an activating aluminum phosphate compound; and contacting the mixture of zeolite and aluminum phosphate with liquid water at elevated temperature under conditions to increase catalytic activity of the zeolite. This technique is particularly adapted for treating the zeolite in intimate mixture with about 10 to 90 weight percent of aluminum phosphate based on composite weight in the presence of water. The activation process may be used for treating calcined zeolites composited with an activating agent comprising aluminum phosphate. The hydrothermal treatment may be carried out at a temperature of about 80° C. to 370° C., preferably about 150° to 200° C.

EMBODIMENTS

The hydrothermal water treatment should assure intimate contact between the finely divided zeolite particles and the solid activating aluminum phosphate and also provide sufficient liquid phase to completely envelope the solid particles. Thus, when the mixture is raised to an elevated temperature, aluminum migrates from the aluminum phosphate phase into the zeolite cyrstal lattice. It is not fully understood by what mechanism the activating aluminum migrates; however, the elevated temperatures involved could ionize the aluminum in the multi-phase system.

Unlike conventional ion exchange processes, the aqueous medium can consist essentially of water at neutral pH. However, it is possible to have non-deleterious solutes in the aqueous phase, such as salts, which adjust the pH to about 3 to 8. It is known that alkaline pH of about 10 to 11 will solubilize aluminum as Al(OH)$_4^-$ ion, and the lower pH assures that the activating metal ions will most likely be cationic (e.g., hydrated Al$^{+3}$).

The zeolites which may be used in the present process have a silica to alumina ratio of at least 70 and preferably higher. It has been found that the degree of enhancement in the activity of the zeolite becomes greater as the silica to alumina ratio of the zeolite increases. Accordingly, the higher silica to alumina ratios are preferred and generally ratios of above 500:1. Marked enhancement of activity is obtained at ratios over 2000:1. The silica to alumina ratio may be determined by conventional analysis. The ratio represents, as closely as possible, the ratio in the rigid anionic framework of the zeolite crystal i.e. the structural or framework silica:alumina ratio and excludes materials such as aluminum in binder or in another form within the channels of the zeolite. The ratio may be determined by conventional methods such as ammonia desorption/TGA.

The zeolites are also characterized by their Constraint Index, which is about 1 to 12. The Constraint Index is a measure of the constraint imposed by the crystal structure of the zeolite on the access by molecules of differing sizes to the internal structure of the crystal. A measure of such constraint is desired in order to obtain the desired conversions. It is sometimes possible to judge from a known crystal structure whether constrained access of this kind exists. For example, if the only pore windows in a crystal are formed by 8-membered rings of silicon and aluminum atoms, molecules with a cross-section larger than normal hexane will be excluded.

The Constraint Index provides a convenient indication of the extent to which a zeolite provides this restrained access. A method for determining Constraint Index, together with values of the Index for exemplary zeolites, is described in U.S. Pat. No. 4,016,218 and J. Catalysis 67, 218–222 (1981) to which reference is made for details of the method. Because Constraint Index is a characteristic which is dependent upon the structure of the zeolite but is measured by means of a test which is dependent upon the cracking or acid activity of the zeolite, the test candidate should be representative of the zeolite in structure and have adequate cracking activity. Cracking activity may be varied by known artifices such as steaming, base exchange or variation of the silica:alumina ratio.

Zeolites which may be treated by the present activation process include ZSM-5, ZSM-11, ZSM-12, ZSM-23, ZSM-35, ZSM-38 and other similar materials having the appropriate characteristics. ZSM-5 is described in U.S. Pat. No. 3,702,886; ZSM-11 in U.S. Pat. No. 3,709,979; ZSM-12 in U.S. Pat. No. 3,832,449; ZSM-23 in U.S. Pat. No. 4,076,842; ZSM-35 in U.S. Pat. No. 4,016,245 and ZSM-38 in U.S. Pat. No. 4,046,859.

Highly siliceous forms of ZSM-5 are described in U.S. Pat. No. Re. 29,948, highly siliceous forms of ZSM-11 in U.S. patent application Ser. Nos. 003,143 (now abandoned) and 003,145 (now abandoned), filed Jan. 15, 1979 and highly siliceous forms of ZSM-12 in U.S. patent application Ser. Nos. 003,144 (now abandoned) and 003,146, (pending) filed Jan. 15, 1979.

When the zeolites are prepared in the presence of organic cations they are initially catalytically inactive, possibly because the intracrystalline free space is occupied by organic cations from the forming solution. They may be activated by heating in an inert atmosphere at 1000° F. (538° C.) for one hour, for example, followed by exchange with ammonium salts followed by calcination at 1000° F. (538° C.) in air. The presence of orqanic cation in the forming solution may not be absolutely essential to the formation of the zeolite but these cations do appear to favor the formation of the desired crystal structure.

The preferred zeolites have a crystal framework density, in the dry hydrogen form, not substantially below about 1.6 g.cm$^{-3}$. The dry density for known structures may be calculated from the number of silicon plus aluminum atoms per 100 cubic Angstroms, as given, e.g., on page 19 of the article on Zeolite Structure by W. M. Meier, including in "Proceedings of the Converence on Molecular Sieves, London, Apr. 1967", published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. Crystal framework densities of some typical zeolites are disclosed in European Patent Application No. 34444, corresponding to U.S. Pat. No. 4,326,994 which was issued on Apr. 27, 1982.

When it has been synthesized in the alkali metal form, the zeolite may be converted to the hydrogen form, generally by intermediate formation of the ammonium form by ammonium ion exchange and calcination. The original alkali metal of the zeolite or introduced hydrogen cations may be partially replaced by ion exchange with other suitable ions of Groups IB to VIII of the Periodic Table, including, by way of example, nickel, cadmium, copper, zinc, palladium, calcium or rare earth metals.

Particular emphasis here is placed on the use of composite materials for making activated catalysts. The zeolite may be composited with an activating aluminum phosphate compound which is capable of activating the zeolite by the creation of additional active sites when the composite is steamed. The activating agent can function as a binder for the zeolite. A separate alumina binder such as hydrated alumina, preferably in the trihydrate, may be used, but other binders may also be used in combination with alumina, for example, silica-alumina, silica-zirconia, silica-thoria, silica-berylia, silica-titania as well as ternary compositions, such as silica-alumina-thoria, silica-alumina-zirconia, silica-alumina-magnesia or silica-magnesia-zirconia.

In general, the amount of binder can be from less than 10 to over 90 percent by weight of the combined zeolite and binder, preferably 20 to 80 percent by weight. The catalyst may be composited with 25 to 50 percent by weight of binder, based on total solids weight.

The catalyst can be composited with activating agent and/or the binder by intimately mixing by grinding or mulling the materials together, in the presence of water, after which the mixture is formed into suitable particles and dried. It has been found that greater enhancement of activity occurs if the zeolite and aluminum compounds are intimately mixed together. The mixture of zeolite, binder and water may conveniently be formed into particles by extrusion using an extrusion press or, alternatively, other shaping methods may be used such as pelletizing or pressing. The amount of water is chosen as to give a mixture which has a satisfactory consistency for the forming step. The zeolite may contain sufficient occluded water or sufficient water may be present in the binder.

The zeolite may be treated to convert it to the desired form either before or after it is composited with the binder. Thus, if it is synthesized in the alkali metal form it may be converted to the hydrogen or another cationic form, e.g., ammonium form before or after compositing with the binder. If conversion entails more than one step the requisite steps may, if desired, be carried out at different stages of the process, some before compositing and some after. Generally, however, the zeolite should be at least partly in the hydrogen form during the hydrothermal treatment or, alternatively, in a form which will be wholly or partly converted to the hydrogen form under the conditions employed during treatment. The ammonium form or the alkylammonium forms are readily converted at elevated temperatures.

After a zeolite/aluminum phosphate composite has been formed it may be treated hydrothermally. During this step, the aqueous media surrounding the composite is held in the liquid state. This can be achieved at elevated temperature by maintaining at least the autogenous pressure of the liquid. The treatment should generally be continued for at least one hour and usually durations of several hours are required. A period of 12 to 48 hours under hydrothermal conditions is preferred.

The activity of the catalyst is measured in terms of its acid cracking (alpha) value, which reflects the relative activity of the catalyst with respect to a high activity silica-alumina cracking catalyst. To determine the alpha value, n-hexane conversion is determined at a suitable temperature between about 550° F. to 1000° F. (288° to 538° C.), preferably at 1000° F. (538° C.). Conversion is varied by variation in space velocity such that a conversion level of up to about 60 percent of n-hexane is obtained and converted to a rate constant per unit volume of zeolite and compared with that of silica-alumina catalyst which is normalized to a reference activity of 1000° F. (538° C.). The catalytic activity of the catalyst is then expressed as multiple of this standard, i.e. the silica-alumina standard (first order rate constant k=0.016 sec.$^{-1}$). The silica-alumina reference catalyst contains about 10 weight percent $Al_2O_3$ and the remainder $SiO_2$. This method of determining alpha, modified as described above, is described in the Journal of Catalysis, Vol. VI, pages 278–287, 1966, to which reference is made for further details of the method.

The present hydrothermal activation process may be conducted under various treatment conditions. The elevated temperature of the liquid aqueous media is selected to provide adequate reaction rate. Although some activation is observed at moderately elevated temperatures of 80° C. to 100° C., the activation rate is quite slow. Generally, the treatment proceeds well at temperatures in the range of about 140° C. to 370° C. preferably about 145° C. to 200° C., using an enclosed pressure vessel to maintain at least the autogenous pressure up to about 17 atmospheres (1700 kPa).

Above the normal boiling point of the liquid, superatmospheric pressure is applied to maintain the aqueous media in the liquid phase. Where essentially pure water is employed, the autogenous pressure may vary from 1 atmosphere (101 kPa) at 100° C. to over 218 atmospheres at the critical temperature of water at 374° C. (736° F.). Above this temperature, pure water cannot be maintained in liquid phase.

Under neutral conditions or acid pH, metal oxide-containing agents tend to form cationic species; however, amphoteric metals or other agents may be employed in the anionic form as well, especially in basic systems at pH greater than 7.

The amount of activating agent employed in the treatment may be varied considerably within the inventive concept. Significant activity improvement is achieved where finely-divided solids are milled together with the aqueous liquid phase to provide a large contact area between the solid phases.

Typically, the weight ratio of zeolite to activating agent is about 10:1 to 1:10, based on dry solids. The amount of water maintained in the liquid phase in contact with the zeolite should be sufficient to completely wet the reactants and/or to fill interstitial voids in the composited solids. Wet milled composites provide both intimate solid to solid contact and thorough dispersion in the aqueous liquid phase.

The aluminum phosphate material may be in the form of an amorphous material or a crystalline material. Particularly preferred aluminum phosphate materials are crystalline, microporous materials described in U.S. Pat. Nos. 4,310,440 and 4,385,994, for example. These aluminum phosphate materials have electroneutral lattices and, therefore, are not particularly useful as ion-exchangers or as catalyst components. Microporous aluminum phosphates may have an organic amine or quaternary ammonium salt entrapped within the aluminum phosphate and playing a role as crystallization template. Also, $H_2O$ may fill the microporous voids, especially in the as synthesized form of the aluminum phosphate. Because of the aluminum/phosphorous atomic ratio of these materials being about unity, they display virtually no ion-exchange properties, the framework positive charge on phosphorus being balanced by corresponding negative charge on aluminum:

$$AlPO_4 = (AlO_2^-)(PO_2^+)$$

The pores of these microporous aluminum phosphates are uniform and have nominal diameters within the range of about 3 to 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

Composites of low acidity zeolites and aluminum phosphates are activated by heating in the presence of water. Examples of such low acidity zeolites include boron-containing ZSM-5, boron-containing zeolite Beta and high $SiO_2/Al_2O_3$ aluminosilicate ZSM-5. An Example of an aluminum phosphate material is $AlPO_4$-5, which is described in the aforementioned U.S. Pat. No. 4,310,440.

EXAMPLE 1

$AlPO_4$-5 was prepared in a manner similar to that disclosed in Example 5 of U.S. Pat. No. 4,310,440 using 85% phosphoric acid, hydrated alumina (pseudo-boehmite phase), and triethylamine as template. Crystallization was effected in a teflon-lined autoclave at 195° C. for 27 hours at autogeneous pressure. X-ray diffraction of the dried product revealed $AlPO_4$-5 as the major product. As-crystallized $AlPO_4$-5 was calcined in air at 1000° F. for three hours prior to compositing.

EXAMPLE 2

An as-crystallized high $SiO_2/Al_2O_3$ ZSM-5 sample was prepared and converted into an H-form by initial calcination in air at 1000° F. for 3 hours, followed by exchange (in triplicate) with 0.5 N ammonium chloride - 0.5 N ammonium hydroxide, and final calcination at 1000° F. in air for 1 hour. The resulting zeolite, used in the activation procedure, had the following compositon, wt %:

| $SiO_2$ | 97.4 |
| $Al_2O_3$ | 0.007 |
| Na | 0.0185 |
| Ash | 98.33 |

EXAMPLE 3

An as-crystallized boron-containing ZSM-5 sample with the following composition was calcined in air at 1000° F. for 3 hours prior to compositing, wt %:

| $SiO_2$ | 84.0 |
| $B_2O_3$ | 2.77 |
| $Al_2O_3$ | 0.0565 |
| N | 1.81 |
| Na | .0026 |
| Ash | 88.8 |

EXAMPLE 4

As-crystallized boron-containing zeolite Beta was exchanged once with 1.0M ammonium nitrate at room temperature for 24 hours and then calcined in air at 1000° F. for 3 hours. The final product (used in the activation procedure) had the following compsotion, wt %:

| $SiO_2$ | 92.3 |
| $B_2O_3$ | 3.86 |
| $Al_2O_3$ | 0.111 |
| Na | 0.16 |
| Ash | 96.0 |

Calcined $AlPO_4$-5 and H-form zeolites were dry-mixed and hydrothermally treated and tested for activity by n-hexane cracking (alpha) as described in Examples which follow.

EXAMPLE 5

3.0 g of an H-form of a boron-containing zeolite Beta prepared in accordance with Example 4 and 3.0 g of calcined $AlPO_4$-5 prepared in accordance with Example 1 were ground together. The composite had an alpha of 1.

EXAMPLE 6

The composite of Example 5 (4.0 g) was slurried in 100 ml water and heated in a polypropylene jar in a steam box at 100° C. for 24 hours. The hydrothermally treated product was filtered, dried at 250° F. for 1 hour, and calcined in air at 100° F. for one hour. The alpha of this product was 355, indicating a substantial increase in activity due to hydrothermal treatment.

EXAMPLE 7

8.0 g of an H-form of a boron-containing ZSM-5 sample prepared in accordance with Example 3 and 8.0 g of calcined $AlPO_4$-5 prepared in accordance with Example 1 were ground together. The composite had an alpha of 3.

EXAMPLE 8

The composite of Example 7 (6.0 g) was slurried in 150 ml water and heated in a polypropylene jar in a steam box for 24 hours. The product was filtered, dried at 250° F. for one hour, and calcined at 1000° F. in air for one hour. The composite had an alpha of 7, indicating activation due to hydrothermal treatment.

EXAMPLE 9

The composite of Example 7 (6.0 g) was slurried in 150 ml water and heated in a teflon-lined autoclave at 195° C. for 24 hours at autogeneous pressure. The product was filtered, dried at 250° F., and calcined in air at 1000° F. for one hour. The product had an alpha of 253, indicating substantial activation due to hydrothermal treatment.

EXAMPLE 10

8.0 g of an H-form of a high $SiO_2/Al_2O_3$ ZSM-5 sample prepared in accordance with Example 2 and 8.0 g of calcined $AlPO_4$-5 prepared in accordance with Example 1 were ground together. The composite had an alpha of 1.

EXAMPLE 11

The composite of Example 10 (6.0 g) was slurried in 150 ml water and heated in a polypropylene jar in a steam box for 24 hours. The product was filtered, dried at 250° F., and calcined at 1000° F. in air for one hour. The resulting composite had an alpha of 3, indicating activation due to hydrothermal treatment.

EXAMPLE 12

The composite of Example 10 (6.0 g) was slurried in 150 ml of water and heated in a teflon-lined autoclave at 195° C. for 24 hours at autogeneous pressure. The product was filtered, dried at 250° F., and calcined at 1000° F. in air for one hour. The resuting composite had an alpha of 4, indicating activation as a result of hydrothermal treatment.

What is claimed is:

1. A hydrothermal method for enhancing acid catalytic activity of low acidity crystalline zeolite which comprises contacting said zeolite, an activating amount of aluminum phosphate and an aqueous liquid medium at elevated temperature under conditions to increase catalytic activity of the zeolite.

* * * * *

UNITED STATES PATENT AND TRADEMARK OFFICE
CERTIFICATE OF CORRECTION

PATENT NO.   :   4,605,637
DATED        :   August 12, 1986
INVENTOR(S)  :   Chang et al.

It is certified that error appears in the above-identified patent and that said Letters Patent is hereby corrected as shown below:

On the title page:

Delete "Michael E. Landis, Woodbury;" from the list of inventors

Col. 8, line 56, In Example 6, "100°F" should read --1000°F--.

Signed and Sealed this
Second Day of December, 1986

*Attest:*

DONALD J. QUIGG

*Attesting Officer*            *Commissioner of Patents and Trademarks*